Aug. 24, 1965   C. H. VIEBROCK   3,202,154
GRAIN SAVING ATTACHMENT FOR COMBINE
Filed July 3, 1963   2 Sheets-Sheet 2

INVENTOR.
CARL H. VIEBROCK
BY Seed & Berry
ATTORNEYS

United States Patent Office 3,202,154
Patented Aug. 24, 1965

3,202,154
GRAIN SAVING ATTACHMENT FOR COMBINE
Carl H. Viebrock, P.O. Box 84, Douglas, Wash.
Filed July 3, 1963, Ser. No. 292,659
3 Claims. (Cl. 130—27)

This invention relates to improvements in harvester-threshers, commonly known as combines, which are used for harvesting fields of grain such as wheat, and pertains particularly to a mechanism by which an increased amount of grain is salvaged from the tailings prior to the discharge of the tailings from the machine.

Combines must frequently operate in the field over rough and sloping terrain and under these adverse conditions the efficiency of most present-day machines is seriously impaired. It has been found that threshers which do not employ special costly automatic devices for levelling the grain-separating sieves cannot effectively cope with the uneven distribution of tailings which tend to accumulate in deep masses at the downslide lateral edge of the sieve. These masses of tailings are not effectively disposed by the air blast directed at the sieve, with the result that considerable amounts of grain remain entrapped in the tailings and are discharged and lost overboard at the discharge end of the sieve.

Some attempts have been made in the past to reduce the loss of grain by collecting the tailings at the discharge end of the sieve and conveying them back to the threshing cylinder for a complete recycle through the thresher. This has been found to expose the grain to further unnecessary abrasion while at the same time the short pieces of straw from the tailings are further shredded to smaller sizes. These smaller bits of straw tend to form an even more homogeneous, easily compacted mass which further contributes to the entrapment of grain when the mixture of tailings and grain is again delivered to the sieves—particularly if the machine is still operating on sloping ground so as to pile the tailings at the low side of the sieves as before.

Other attempts to reduce the loss of grain by running the thresher at slow speed, in order to provide ample time for the threshing and separation of the grain, have been of dubious value because of the added time and expense necessary to operate at reduced speed. Furthermore, in spite of reduced speeds, excessive amounts of grain are still lost.

It is therefore a principal object of the present invention to prevent the objectionable loss of grain by employing an improved path of recirculation of tailings which provides for the collection of tailings from the discharge end of the sieves for conveyance and distribution upon the straw walkers to thus utilize the bed of straw upon the straw walkers as a screen wherein the chaff and small straw is entrapped while still permitting the grain kernels to fall through and be collected and recovered.

It is also a principal object of the present invention to prevent objectionable losses of grain by employing an improved path of recirculation of tailings which reduces the exposure of the grain to abrasion and facilitates the separation of the grain from the tailings.

A further object of this invention is to provide an improved means of construction of a thresher so as to allow high speeds of operation over the ground while at the same time eliminating objectionable losses of grain.

Another object of this invention is to provide a means of collecting tailings at the discharge end of the sieve of a thresher for conveyance to the straw walkers of the thresher where the tailings are dispersed upon the straw to allow the grain therein to drop free, collected and recovered.

A still further object of this invention is to provide a detachable trough and boot assembly for the collection of tailings at the discharge end of the sieve of a thresher to facilitate repair or replacement of other parts of the thresher.

Other objects and features of the invention will be apparent from the following description taken in conjunction with the following drawings, in which.

Figure 1:
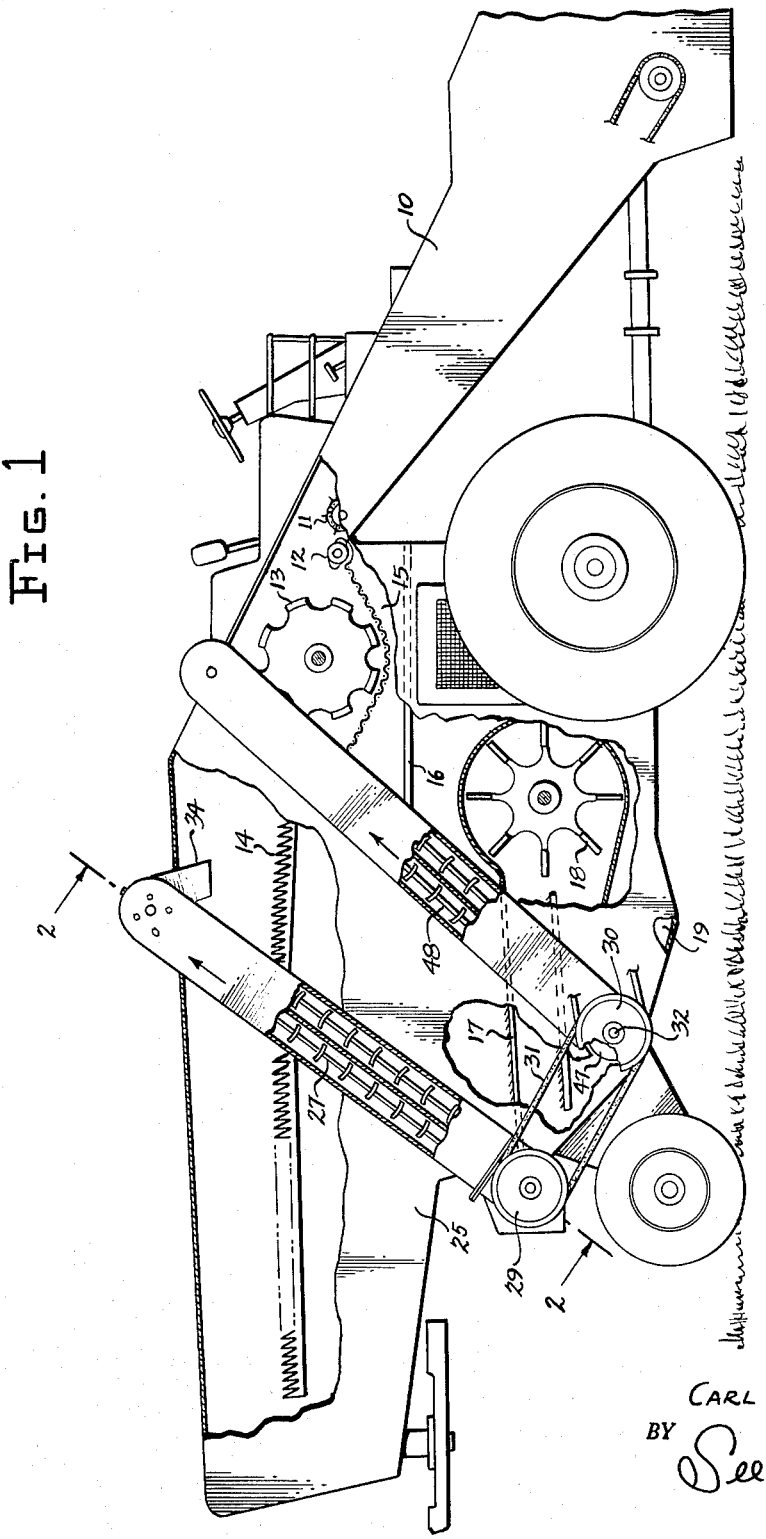
FIG. 1 is a fragmentary side elevational view of a combine embodying the principles of the present invention, with portions thereof broken away and shown in section.

Referring now more particularly to the drawings, the numeral 10 generally designates the elevator housing of a combine through which the freshly cut crop is moved upwardly by the elevator 11 to pass over the front stripper beater 12 immediately prior to being fed to the cylindrical thresher 13 (in the nature of a lantern-wheel) where the principal threshing action takes place. At this point about 90 percent of the heavy straw and the grain are separated. The straw is delivered to the straw walkers 14 in a continuous bed while the separated grain falls through a grate 15 to an underlying vibrating grain pan 16. The grain is accompanied by a considerable amount of small chopped straw, chaff and other material which proceeds by vibratory action along the length of the grain pan 16 and then drops upon lower-level sieves 17. At this point the mixture is subjected to an air blast generated by a fan 18. If the mixture is evenly distributed over the sieves, as would be the case during operation over level ground, little difficulty is experienced in blowing out the lighter elements to immediately release the grain which falls to a grain-collection trough 19 in the bottom of the machine where the grain is picked up by some means such as an auger or conveyor and delivered to a grain storage bin located elsewhere in the machine, but not shown herein.

Under adverse conditions such as tilting of the entire machine over sloping or uneven ground, the material on the sieve (i.e. tailings) will usually pile up in a mass at the low or downhill side thereof, thereby leaving the remaining portions of the sieve completely open and free to the upward passage of air from the fan 18. This makes it impossible for the air to be effectively played upon the massed pile of tailings and as a result little or no separation of chaff and grain takes place. Some of these unseparated tailings fall through the sieve but the major portion of the tailings is shifted to the rear of the machine and is normally discharged upon the ground. Hence, a considerable amount of entrapped grain is generally lost.

Figure 2:
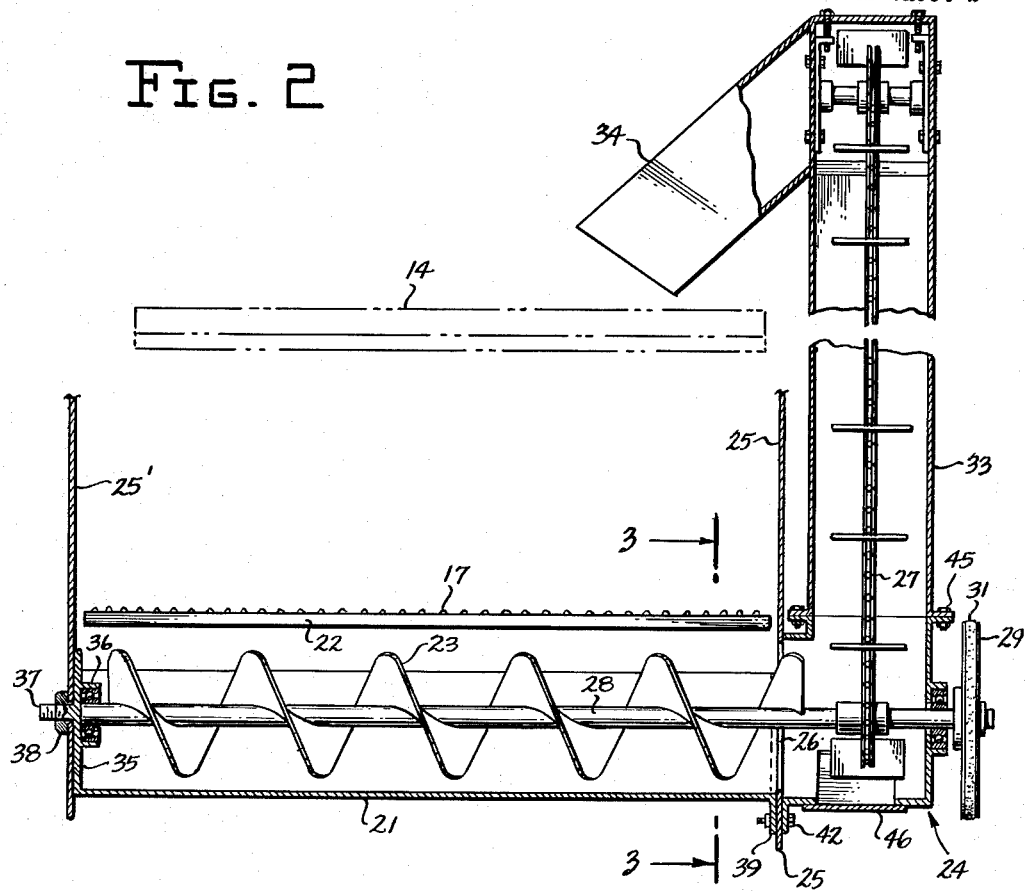
FIG. 2 is a fragmentary transverse sectional view, drawn to an enlarged scale on line 2—2 of FIG. 1.
Figure 3:
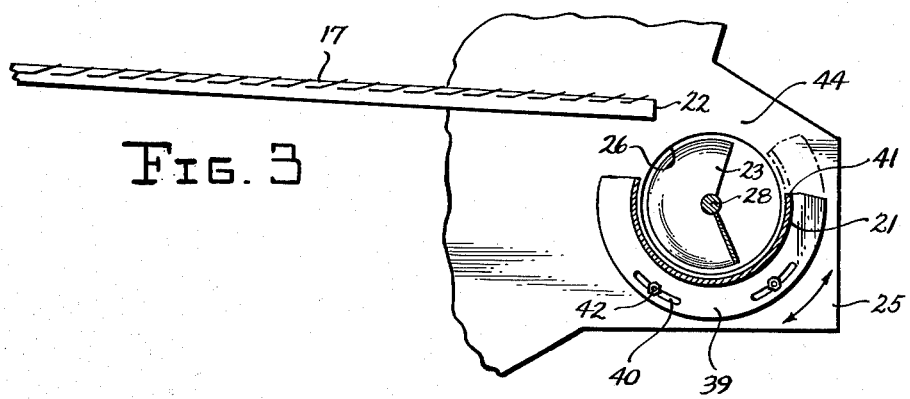
FIG. 3 is a fragmentary longitudinal vertical sectional view on line 3—3 of FIG. 2.

As shown in FIG. 2, the present invention provides a semi-circular trough 21 below the tail or discharge end 22 of the sieve 17. The trough 21 serves to collect the tailings as they are discharged from the sieve 17. An auger 23 carried by a rotary shaft 28 is mounted within the trough 21 to move the tailings into an elevator boot 24 which is rigidly mounted upon the side plate 25 of the thresher. The side plate 25 is provided with an opening 26 through which the auger 23 delivers the tailings to said boot 24. A chain conveyor 27, mounted within the boot 24 and the elevator housing 33, is driven from the auger shaft 28. The auger shaft 28 is fitted upon an exposed end with a pulley 29 and is driven from a pulley 30 (see FIG. 1) by a V-belt 31. Pulley 30 is mounted upon an extension of a power shaft 32 which is an integral part of the drive system of the thresher. Tailings, which have dropped through the sieves 27 are, for the most part, collected in a special trough and moved laterally by a cross-auger 47 to a primary tailing elevator 48 for return to the cylinder 13 for reprocessing. The tailings elevator 48 is a device used on most present day threshers.

The purpose of the chain conveyor 27 is to deliver the remaining tailings to the discharge chute 34 which scatters the tailings upon the straw walkers 14. The straw walkers 14, when carrying their normal loads of straw, act as a porous bed upon which the bits of material of the tailings are carried. The straw walkers have a considerable "bedded" area and thus can accommodate a substantial amount of tailings, holding them somewhat suspended and scattered through the straw bed. The straw acts as a screen of sufficient density to trap the majority of the chaff and small straw, but sufficiently open to allow the kernels of grain to gravitate downwardly and consequently fall through the sieves and finally settle to the grain collection trough 19. The present invention thus assures that no tailings are dumped overboard unless thoroughly screened by the bed of straw upon the straw walkers 14. Thus, substantially all grain will eventually find its way to the grain-collection trough 19 and the machine's grain storage bin. This results in a much higher percentage yield of grain from a given input of crop to the harvester.

It has been found that a thresher, having a second tailings elevator such as described herein may maintain operation at full speed up to six miles per hour without loss of efficiency, even when operating over sloping ground. In addition, up to 20 bushels per day may be added to the normal yield of grain in spite of operation over rough and sloping terrain. Since the machine can operate more or less continuously at normal running speed without slowing down for sloping ground, an increased yield is achieved with decreased cost of operation.

Having described some of the principal operational characteristics and details of construction of the present invention, attention should be directed to some additional features designed to more effectively utilize the present invention.

As shown in FIG. 2, the semi-circular trough 21 is formed at one end with an integral end plate 35 upon which is internally mounted the bearing 36 for the auger shaft 28. The end plate 35 is provided with an outwardly extending pivot stud 37, placed co-axial to shaft 28, which is received through an opening in the frame 25 of the machine to be secured by the nut 38. The opposite end of the trough 21 is provided with an external flange 39 which is provided with a pair of arcuate adjustment slots 40 to receive a pair of locking bolts 42. The slots 40 allow for rotational adjustment of the trough 21 about its longitudinal axis to thus raise or lower the rear lip 41 of the trough 21. Such adjustment is an important feature of the present invention since it makes it possible to adjust the effective width of the gap 44 between the sieve's discharge end 22 and the trough's rear lip 41 to thus control the effect of the air flow passing through the gap 44.

The airblast through a properly adjusted gap 44 removes a portion of the lighter chaff from the tailings before they fall into the trough 21. If the lip 41 is too low, some grain kernels may also be blown rearwardly during their fall and fail to be caught by the trough. If, on the other hand, the lip is too high, very little chaff is caused to be removed from the tailings at this point, thus requiring further unnecessary handling of chaff.

It will be noted from the drawings that the elevator boot 24 and the auger may be readily detached from the main frame 25 of the thresher by merely removing the bolts 38, 42 and 45. The boot 24 is provided with a door 46 which is used to gain access to the lower end of the chain 27 for uncoupling the chain which perforce is required prior to removal of the elevator boot 24. The door 46 may be bolted in place or may be provided with a hinge and latch, as desired.

Thus it is seen that the entire mechanism associated with the present invention is readily detachable from a thresher in case such detachment is necessary to facilitate repair of other parts of the thresher.

Having thus fully described my invention, what I claim as new and desire to secure by Letters Patent is:

1. In a threshing machine, threshing means including a threshing cylinder, a straw walker for transporting a bed-like layer of straw from the cylinder to be discharged at the rear of the machine, a sieve below said straw walker for carrying tailings; a fan below for directing air upwardly through the said sieve to remove chaff from the said tailings, a transverse trough adjacent the discharge end of said sieve, said trough being at all times uncovered for the reception and collection of tailings unworked by said airflow and discharged rearwardly over the end of said sieve, means mounting said trough to allow rotation of the trough about its longitudinal axis for adjustment of the height of the trailing lip of the trough, an auger in said trough for conveyance of tailings along the length of said trough to one end thereof, and an elevator at one end of said trough to receive the tailings from the auger and deliver them upwardly for distribution directly upon the layer of straw lying upon the straw walkers and thereby cause the grain therein to gravitate through the straw and be collected.

2. In a threshing machine, threshing means including a cylinder, a straw walker for the movement of a layer of straw from the said cylinder to the rear of the thresher; a sieve below said straw walker for the separation of the tailings, a fan below said sieve for delivery of air upwardly through the sieve, a transverse trough at the discharge end of said sieve, said trough being at all times uncovered for the reception and collection of unseparated tailings which overflow the discharge end of the said sieve, means mounting said trough to allow rotation of the trough about its longitudinal axis for adjustment of the height of the trailing lip of the trough to control the effect of the airflow between the said sieve and the said trough, and a means for conveying said tailings from the said trough directly to the layer of straw on the straw walker to permit capture of the chaff and small straw within the main layer of straw while permitting the grain to gravitate through the straw and be collected.

3. In combination with a threshing machine including a threshing cylinder, a straw walker for discharging a layer of straw from said cylinder, a sieve below said straw walker for carrying tailings, a fan below said sieve for directing air upwardly through said sieve to remove chaff from said tailings, and a first return means for returning tailings passing through said sieve to said threshing cylinder, a second return system attachment comprising; a transverse trough removably mounted closely adjacent the discharge end of said sieve, said trough being at all times uncovered for receiving and collecting tailings unworked by said airflow and discharged rearwardly over the end of said sieve, means mounting said trough for rotation about its longitudinal axis for adjustment of the height of the trailing lip of the trough, an auger in said trough for conveyance of tailings along the length of said trough to one end thereof, and an auxiliary elevator at one end of said trough to receive the tailings from the auger and deliver them upwardly for distribution directly upon the layer of straw lying upon the straw walker and thereby cause the grain therein to gravitate through the straw and be collected.

References Cited by the Examiner

UNITED STATES PATENTS

| | | | |
|---|---|---|---|
| 680,097 | 8/01 | White | 130—27.6 X |
| 688,823 | 12/01 | Bowers | 130—27.6 |
| 2,309,736 | 2/43 | Makin | 130—27.6 |
| 2,609,929 | 9/52 | King | 130—24 X |

OTHER REFERENCES

John Deere Operator's Manual, No. OM–H61–156, pages 18, 19 and 68, Jan. 1, 1955.

T. GRAHAM CRAVER, *Primary Examiner.*

ANTONIO F. GUIDA, *Examiner.*